United States Patent
Gao et al.

(10) Patent No.: US 10,229,486 B2
(45) Date of Patent: Mar. 12, 2019

(54) METHOD FOR AUTOMATICALLY SEPARATING OUT THE DEFECT IMAGE FROM A THERMOGRAM SEQUENCE

(71) Applicant: UNIVERSITY OF ELECTRONIC SCIENCE AND TECHNOLOGY OF CHINA, Chengdu, Sichuan (CN)

(72) Inventors: Bin Gao, Chengdu (CN); Xiaoqing Li, Chengdu (CN); Guiyun Tian, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 6 days.

(21) Appl. No.: 15/608,320

(22) Filed: May 30, 2017

(65) Prior Publication Data

US 2018/0068432 A1 Mar. 8, 2018

(30) Foreign Application Priority Data

Sep. 6, 2016 (CN) .......................... 2016 1 0804875

(51) Int. Cl.
*G06T 7/00* (2017.01)
*G06F 17/18* (2006.01)
*G06T 7/162* (2017.01)

(52) U.S. Cl.
CPC ............ *G06T 7/0006* (2013.01); *G06F 17/18* (2013.01); *G06T 7/0004* (2013.01); *G06T 7/162* (2017.01);
(Continued)

(58) Field of Classification Search
None
See application file for complete search history.

(56) References Cited

U.S. PATENT DOCUMENTS

| 6,690,016 B1 * | 2/2004 | Watkins | ................. G01N 25/72 |
| | | | 250/341.1 |
| 2007/0220946 A1 * | 9/2007 | Pecina | ................... G01N 17/02 |
| | | | 73/1.01 |

(Continued)

OTHER PUBLICATIONS

Gao et al., "Automatic Defect Identification of Eddy Current Pulsed Thermography Using Single Channel Blind Source Separation," Transactions on Instrumentation and Measurement, vol. 63, Apr. 2014, pp. 913-922.

(Continued)

*Primary Examiner* — Feng Niu
*Assistant Examiner* — Jiangeng Sun
(74) *Attorney, Agent, or Firm* — Oliff PLC

(57) ABSTRACT

A method automatically separates out the defect image from a thermogram sequence based on the physical characteristics of the defect of a conductive material in electromagnetic field. Defect area radiates more heat than other area, when it is mapped to the histogram of the image to be separated, the defect area is located in the top-end of histogram, and the proportion of defect area is smaller to the background or other area. The method equally divides the histogram of the image to be separated into multi groups, and calculates the first derivative $k_i$ of total pixel number $S_i$ of group i, finds the maximum absolute value of $k_i$, i.e. $|k_i|_{max}$, where i is expressed as $i_{max}$; if $i_{max}$ is the last group, $W_n$ is regarded as threshold T, otherwise, $W_{i_{max}+1}$ is selected as threshold T. The pixels that less than threshold T are removed to obtain the defect image in ECPT.

3 Claims, 5 Drawing Sheets

(52) U.S. Cl.
CPC ............... *G06T 2207/10048* (2013.01); *G06T 2207/20072* (2013.01)

(56) References Cited

U.S. PATENT DOCUMENTS

| | | | |
|---|---|---|---|
| 2010/0033565 A1* | 2/2010 | Benzerrouk | G06T 7/0004 348/125 |
| 2011/0040499 A1* | 2/2011 | Koshihara | G01N 21/892 702/35 |
| 2013/0077650 A1* | 3/2013 | Traxler | G01N 25/72 374/5 |

OTHER PUBLICATIONS

Hyvärinen et al., Independent Component Analysis, 2001.

* cited by examiner

METHOD FOR AUTOMATICALLY SEPARATING OUT THE DEFECT IMAGE FROM A THERMOGRAM SEQUENCE

FIELD OF THE INVENTION

This application claims priority under the Paris Convention to Chinese Patent Application No. 201610804875.6, Filed Sep. 6, 2016, the entirety of which is hereby incorporated by reference for all purposes as if fully set forth herein.

The present invention relates to the field of Non-Destructive Testing and Evaluation (NDT&E), more particularly to a method for automatically separating out the defect image from a thermogram sequence which is obtained through Eddy Current Pulsed Thermography (ECPT).

BACKGROUND OF THE INVENTION

Non-Destructive Testing (NDT) technology has extensive scientific foundation and application fields, which is an important measure to guarantee the quality of products and infrastructures. Eddy Current Pulsed Thermography (ECPT) combines the advantages of eddy current and infrared thermal imaging, therefore it can provide non-contact, real-time NDT for a large area of defects of various depths, and wildly used in the field of conductive material's Non-Destructive Testing, and has become a major method for analyzing the defect of conductive material.

In ECPT, when an electromagnetic (EM) field is applied to a conductive material, the temperature increases due to resistive heating caused by induced electric current, which is also known as Joule heating. When a defect, for example a crack exists in the conductive material, eddy current (EC) behavior will be forced to divert, which leads to an increase in EC density in the vicinity of the crack, especially, at the tip and bottom area of the crack, the EC density is much greater than that of other area, which directly leads to spatial variation in Joule heating, and hot spots can be found around the tip and bottom area of the crack. This phenomenon mentioned above can be used to detect the defect of a conductive material. Moreover, the heating spatial and temporal distribution on resultant surface can be captured and recorded by IR camera. After post-processing, the defect can be quantitatively detected and analyzed.

At present, an enormous amount of achievement has been made in the detection and characterization of conductive material's defect, for example, Independent Component Analysis (ICA). In ICA, a thermogram sequence captured and recorded by IR camera is processed by independent component analysis, and according to the spatial and temporal distribution in the thermogram sequence, the defect information can be enhanced and extracted under no prior information. ICA is the prior art, more specific steps can be found in the paper "A. Hyvarinen, J. Karhunen, and E. Oja, "Independent component analysis and blind source separation," John Wiley & Sons, pp. 20-60, 2001".

As a further research in ICA, a new method for analyzing the defect of conductive material has been put forward in the paper "Bin Gao, Libing Bai, Guiyun Tian, W. L. Woo and Yuhua Cheng, "Automatic Defect Identification of Eddy Current Pulsed Thermography Using Single Channel Blind Source Separation," IEEE Transactions on Instrumentation and Measurement, vol. 63, no. 4, pp. 913-922, 2014". In the new method, thermogram sequence is pre-processed by conventional ICA, and then, the independent component with maximum kurtosis is selected and reconstructed as a defect image matrix according to the size of the original thermogram.

However, in prior art, the study of quantitative detection of defect is inadequate and lack of a appropriate automatic segmentation method of extraction, identification and quantification of defect, which obstructs the application of ECPT to NDT industry.

SUMMARY OF THE INVENTION

The present invention aims to overcome the deficiencies of prior art and provides a method for automatically separating out the defect image from a thermogram sequence so as to easily identify and quantify the defect of conductive material, i.e. quantitatively test and identify the defect of a conductive material.

To achieve these objectives, in accordance with the present invention, a method for automatically separating out the defect image from a thermogram sequence is provided, comprising the following steps:

(1). pre-processing the thermogram sequence by ICA obtaining a spatial and temporal heating response sequence (thermogram sequence) from the surface of a conductive material through an Eddy Current Pulsed Thermography (ECPT) testing system, and processing the thermogram sequence by conventional ICA, then, selecting the independent component with maximum kurtosis to reconstruct a defect image matrix according to the size of the original thermogram, where the defect image matrix is the image to be separated;

wherein also including the following steps:

(2). separating out the defect image based on the first derivative statistical characteristics of the image to be separated 2.1) dividing the histogram of the image to be separated into n groups (n≥2), where the magnitude of each group is calculated as follows:

$$\Delta V = \frac{V_{max} - V_{min}}{n}; \quad (1)$$

where $V_{max}$ is the maximum pixel value, and $V_{min}$ is the minimum pixel value in the image to be separated, and subsequently, $V_i$ can be defined as:

$$V_i = V_{min} + i \times \Delta V, \; i=0,1,2 \ldots ,n \quad (2);$$

where each group can be expressed as: $V_0 \sim V_1$, $V_1 \sim V_2, \ldots, V_{n-1} \sim V_n$, accumulating the corresponding pixel number $u_v$ of pixel value v that falls within $V_i \sim V_{i+1}$, and calculating the average pixel value of each group:

$$S_i = \sum_{V_{i-1} \le v < V_i} u_v, \; W_i = \frac{\sum_{V_{i-1} \le v < V_i} v \times u_v}{S_i}, \; i=1,2,\ldots,n-1 \quad (3)$$

$$S_i = \sum_{V_{i-1} \le v < V_i} u_v, \; W_i = \frac{\sum_{V_{i-1} \le v < V_i} v \times u_v}{S_i}, \; i=n;$$

where $W_i$ is the average pixel value of group i, $S_i$ is the total pixel number of group i;

2.2) calculating the first derivative $k_i$ of the total pixel number $S_i$:

$$k_i = S_i - S_{i-1}, \ i=1,2,\ldots,n, \text{ where } S_0=0 \qquad (4);$$

and at this point, the first derivative curve based on the histogram of the image to be separated is obtained;

2.3) finding the maximum absolute value of $k_i$, i.e. $|k_i|_{max}$, where i is expressed as $i_{max}$;

obtaining the defect image by removing the pixels which values are less than threshold T from the image to be separated, where if $i_{max}$ is equal to group number n, threshold T is $W_n$, otherwise, threshold T is $W_{i_{max}+1}$.

The objectives of the present invention are realized as follows:

The present invention, i.e. method for automatically separating out the defect image from a thermogram sequence is provided based on the physical characteristics of the defect of a conductive material in electromagnetic field. Especially, defect area radiates more heat than other area, when it is mapped to the histogram of the image to be separated, the defect area is located in the top-end of histogram, and the proportion of defect area is smaller to the background area, i.e. other area. Accordingly, the present invention equally divides the histogram of the image to be separated into multi groups, and calculates the first derivative $k_i$ of total pixel number $S_i$ of group i, finds the maximum absolute value of $k_i$, i.e. $|k_i|_{max}$, where i is expressed as $i_{max}$; if $i_{max}$ is the last group, $W_n$ is regarded as threshold T, otherwise, $W_{i_{max}+1}$ is selected as threshold T. The pixels that less than threshold T are removed to obtain the defect image in ECPT, thus the objectives of quantitatively testing and identifying the defect of a conductive material are achieved.

BRIEF DESCRIPTION OF THE DRAWING

The above and other objectives, features and advantages of the present invention will be more apparent from the following detailed description taken in conjunction with the accompanying drawings, in which.

DETAILED DESCRIPTION OF THE PREFERRED EMBODIMENT

Figure 1:
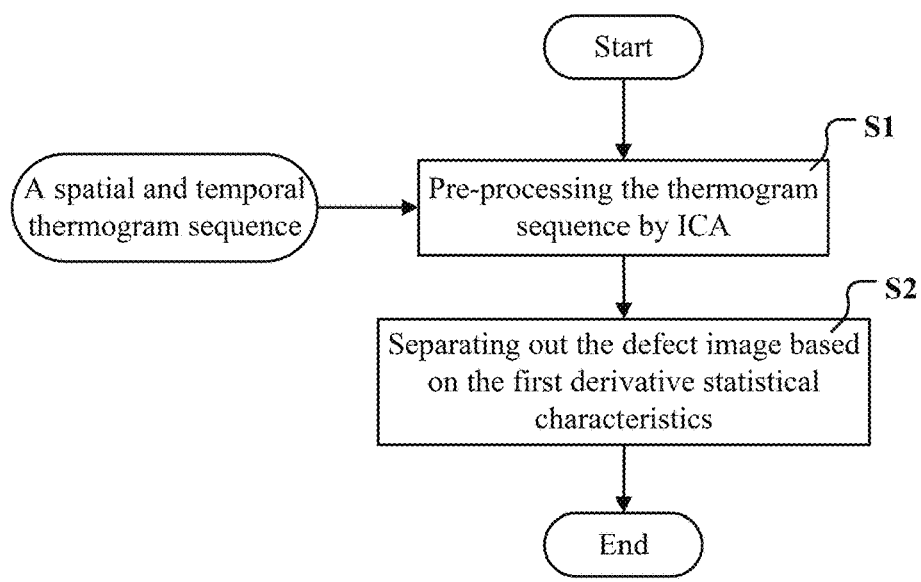
FIG. 1 is a flow chart diagram of automatically separating out the defect image from a thermogram sequence in accordance with one embodiment of the present invention.

Hereinafter, preferred embodiments of the present invention will be described with reference to the accompanying drawings. It should be noted that the similar modules are designated by similar reference numerals although they are illustrated in different drawings. Also, in the following description, a detailed description of known functions and configurations incorporated herein will be omitted when it may obscure the subject matter of the present invention.

FIG. 1 is a flow chart diagram of automatically separating out the defect image from a thermogram sequence in accordance with one embodiment of the present invention.

In one embodiment, as shown in FIG. 1, the method for automatically separating out the defect image from a thermogram sequence comprises the following two steps:

Step S1: pre-processing the thermogram sequence by ICA

Obtaining a spatial and temporal heating response sequence (thermogram sequence) from the surface of a conductive material through an Eddy Current Pulsed Thermography (ECPT) testing system, and processing the thermogram sequence by conventional ICA, then, selecting the independent component with maximum kurtosis to reconstruct a defect image matrix according to the size of the original thermogram, where the defect image matrix is the image to be separated. Conventional ICA belongs to prior art, therefore, the description of it in detail is not given here.

Figure 2A:
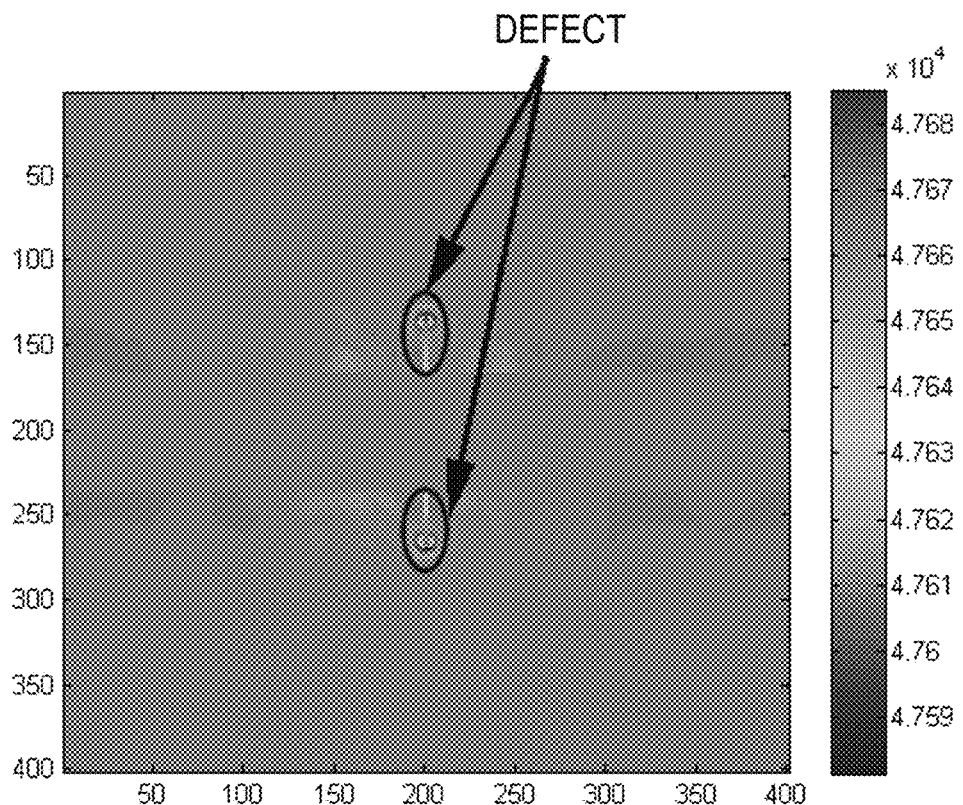
FIGS. 2(a)-2(c) are illustration of separating the defect image based on first derivative statistical characteristics of the image to be separated, which is shown as step S1 in FIG. 1, in accordance with the present invention, where (a) is the image to be separated which is obtained through processing the thermogram sequence by conventional ICA, (b) is the histogram of the image to be separated, (c) is the defect image separating out from the thermogram sequence.
Figure 2B:
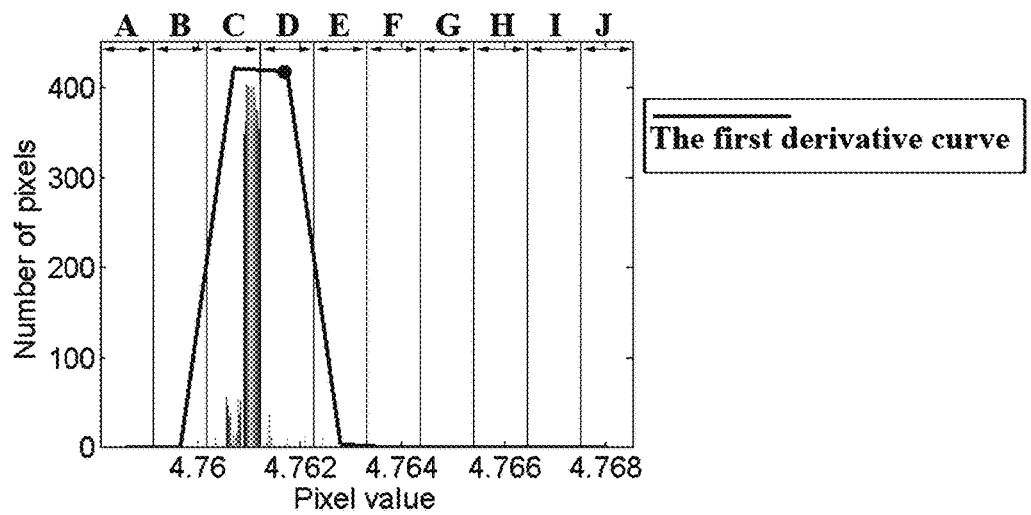

Step S2: separating out the defect image based on the first derivative statistical characteristics of the image to be separated In the embodiment, the image to be separated which is obtained through processing the thermogram sequence by conventional ICA is shown in FIG. 2(a), and the histogram of an image to be separated is shown in FIG. 2(b). The histogram directly reflects the distribution of the pixel number for different pixel value. Taking into account the physical characteristics of defect in ECPT testing system, in the present invention, the histogram of the image to be separated is divided into n groups (n≤2), and the magnitude of each group is calculated as follows:

$$\Delta V = \frac{V_{max} - V_{min}}{n}; \qquad (1)$$

where $V_{max}$ is the maximum pixel value, and $V_{min}$ is the minimum pixel value in the image to be separated, and subsequently, $V_i$ can be defined as:

$$V_i = V_{min} + i \times \Delta V, \ i=0,1,2\ldots,n \qquad (2);$$

where each group can be expressed as: $V_0 \sim V_1$, $V_1 \sim V_2, \ldots, V_{n-1} \sim V_n$, accumulating the corresponding pixel number $u_v$ of pixel value v that falls within $V_i \sim V_{i+1}$, and calculating the average pixel value of each group:

$$S_i = \sum_{V_{i-1} \leq v < V_i} u_v, \ W_i = \frac{\sum_{V_{i-1} \leq v < V_i} v \times u_v}{S_i}, \ i=1,2,\ldots,n-1 \qquad (3)$$

$$S_i = \sum_{V_{i-1} \leq v \leq V_i} u_v, \ W_i = \frac{\sum_{V_{i-1} \leq v \leq V_i} v \times u_v}{S_i}, \ i=n;$$

where $W_i$ is the average pixel value of group i, $S_i$ is the total pixel number of group i.

The total pixel number $S_i$ of each group forms a discrete model, so, the first derivative of the total pixel number $S_i$ can be calculated as follows:

$$k_i = S_i - S_{i-1}, \ i=1,2,\ldots,n, \text{ where } S_0=0 \qquad (4).$$

At this point, the first derivative curve based on the histogram of the image to be separated is obtained.

Finding the maximum absolute value of $k_i$, i.e. $|k_i|_{max}$, where i is expressed as $i_{max}$, and $|k_i|_{max}$, is taken as an alternative point of the defect area and background area.

Finding the maximum absolute value of $k_i$, i.e. $|k_i|_{max}$, where i is expressed as $i_{max}$, and $|k_i|_{max}$, is taken as an alternative point of the defect area and background area.

For the defect area is located in the top-end of histogram in ECPT, in order to detect the defect more accurately and avoid the interference from the background, the right side of $|k_i|_{max}$ is taken as defect area.

In the present invention, the defect image is obtained by removing the pixels which values are less than threshold T from the image to be separated, where If $i_{max}$ is equal to n, threshold T is $W_n$, otherwise, threshold T is $W_{i_{max}+1}$. In other words, the defect image is the image alter the pixels which values are less than threshold T is removed from the image to be separated.

Figure 2C:
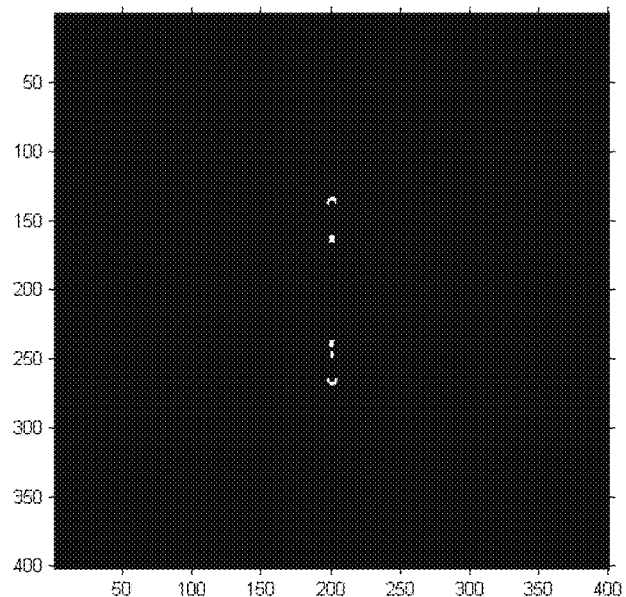

In the embodiment, as shown in FIG. 2(b), according to the technical idea mentioned above, the histogram is divided into 10 groups equally, that is, n=10. And the dot shown in FIG. 2(b) is taken as the threshold T, then, the defect image separating out from the thermogram sequence is shown in FIG. 2(c).

Based on the first derivative statistical characteristics of the image to be separated, the threshold T can be obtained. However, Different group number n will affect the values of the maximum absolute value $|k_i|_{max}$, and the threshold T, and further affect the quality of the defect image separated from a thermogram sequence.

In order to find a suitable, i.e. optimal group number n that can improve the quality of the defect image separated from a thermogram sequence, in another embodiment, a genetic algorithm (GA) is employed to optimize group number n and further optimize the threshold T. The genetic algorithm comprises the following steps:

3.1) Initializing and Coding the Population randomly generating a number of individuals with equal probability, and taking them as an initial population $\{X_1, X_2, \ldots, X_c, \ldots, X_m\}$, where m is the size of the initial population, i.e. the number of the generated individuals, $X_c$ is the individual of number c, the value of each individual is fallen in the scope that the group number can be selected according to the histogram of the image to be separated; The size of the initial population can't be too large nor too small, otherwise, the convergence speed will be very slow, or the optimal group number n cannot be obtained. In the embodiment, the size m of the initial population is 10, the value of each individual is within the range of 2~255.

3.2) Calculating the Fitness of Each Individual

The fitness H is used to evaluate the survivability of each individual, the greater the value of the fitness is, the stronger the survivability of the individual is, and the individual is more close to the optimal group number n. In the embodiment, image entropy is chosen as the fitness function:

$$H = \sum_{d=0}^{D} p_d \log p_d; \quad (5)$$

where $p_d$ is the pixel number of pixel value d, D=1.

In the embodiment, taking each individual $X_c$ in initial population as a group number n, and separating the defect image $R_C$ from the image to be separated according to step S2, then processing the defect image $R_C$ into a binary image, i.e. the pixels removed are filled with 0, and the pixels not removed are filled with 1, and calculating the fitness $H_C$ of the binary image as follows:

$$H_c = \sum_{d=0}^{D} p_d \log p_d; \quad (6)$$

where $p_d$ is the pixel number of pixel value d in the binary image, D=1;

3.3) Selecting a Genetic Seed

In the embodiment, the strategy of selecting a genetic seed is that: if the fitness of a individual in current population is smaller than the maximum individual fitness in previous population, the individual in current population will randomly be replaced by one of the individuals in previous population which fitness are greater than it, i.e. the individual in current population, and the current population replaced will be taken as the genetic seed. for example, the fitnesses of the individuals in previous population are sorted in ascending order as $\{H_1, H_2, H_3, H_4, H_5, H_6\}$, the fitnesses of the individuals in current population are sorted in ascending order as $\{h_1, h_2, h_3, h_4, h_5, h_6\}$, Sorting fitnesses of previous and current population in ascending order, the result is $H_1 < H_2 < H_3 < h_1 < h_2 < H_4 < H_5 < H_6 < h_3 < h_4 < h_5 < h_6$. Therefore, anyone of the individual having fitness $h_1$ and the individual having fitness $h_2$ in current population will randomly be replaced by one of the individual having fitness $H_4$, the individual having fitness $H_5$ and the individual having fitness $H_6$ randomly.

If the current population is the initial population, the initial population is taken as the genetic seed.

Figure 3:
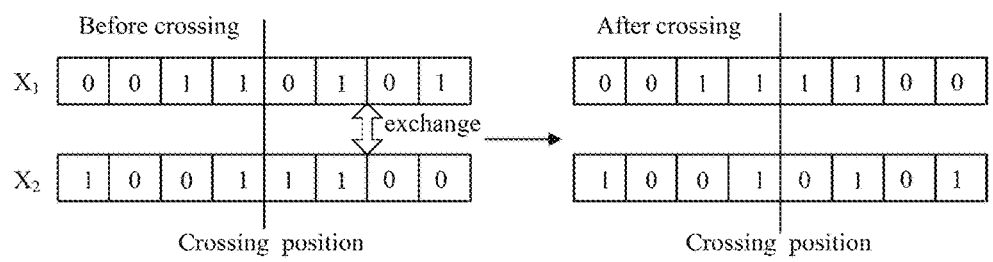
FIG. 3 is a diagram of crossover in genetic algorithm.

3.4) Crossing the Genetic Seed;

Crossing means that some bits of the two individuals in the genetic seed are exchanged. As shown in FIG. 3, the last four bits of individual $X_1$ are exchanged with the last four bits of individual $X_2$. The operation of crossing is performed based on a crossover probability $P_c$. The greater the crossover probability $P_c$ is, the more bits are exchanged, but the probability of destroying the quality of population increases. However, smaller crossover probability will lead to the stagnation of genetic search, and is not conducive to obtaining the optimal group number n. Generally, the crossover probability is within the range 0.4~0.9. Here the crossover probability is set as 0.4.

Figure 4:
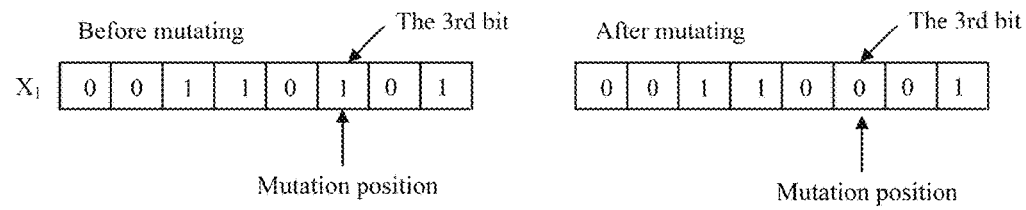
FIG. 4 is a diagram of mutation in genetic algorithm.

3.5) Mutating the Crossed Genetic Seed;

Mutation means that some bits of some individuals in the crossed genetic seed are changed from 1 to 0, or 0 to 1. As shown in FIG. 4, the third bit is changed from 1 to 0. The operation of mutation is performed based on a mutation probability $P_m$, and the mutation probability $P_m$, cannot exceed 0.5, or the Genetic Algorithm will be a random search, and difficult to converge. Here, the mutation probability is set as 0.3.

3.6) Taking the Mutated Genetic Seed as the Current Population, and Calculating the Fitness of Each Individual in the Current Population According to the Step 3.2);

returning to the step 3.3), if the number of generations of population doesn't reach the set value;

or terminating the iteration, and selecting the individual having maximum fitness from the current population as the optimal group number n, and finding the corresponding threshold T, then, separating out the defect image from the image to be separated for the purposes of quantitatively testing and identifying the defect of a conductive material.

The number of generations of population can be selected within the range of 5~10. In the embodiment, it is set as 7.

All parameters described above can be selected by using Monte-Carlo repeated experiment. For more detailed description of the principle of genetic algorithm, please see the paper "D. E. Goldberg, J. H. Holland, "Genetic algorithms and machine learning," Machine learning, vol. 3, no. 2, pp. 95-99, 1988".

FIGS. 5(a)-5(f) show comparison of two defect images respectively separated out with conventional method and present invention, where (a) is the image of a natural crack specimen, (b) is the image to be separated which is obtained through processing the thermogram sequence by conventional ICA, (c) is a defect image separated out based on Otsu, (d) is a defect image separated out based on iterative threshold (IT), (e) is a defect image separated out based on Hamadani, (f) is a defect image separated out based on the present invention. From the comparison, we can find that, in the defect images which are separated out based on conventional separation method, the defect is not easy to identify due to background interference, and in the defect image which is separated out based on the present invention, the background interference is restrained, the defect is extracted accurately. To objectively evaluate the performance of various separating methods, two indictors are employed, i.e. TPR=TP/(TP+FN and FPR=FP/(TP+FP), where TP means that the defect exists and is separated out, FN means that the defect exists and not be separated out, FP means that no defect exists but separating out a defect.

Figure 5A:
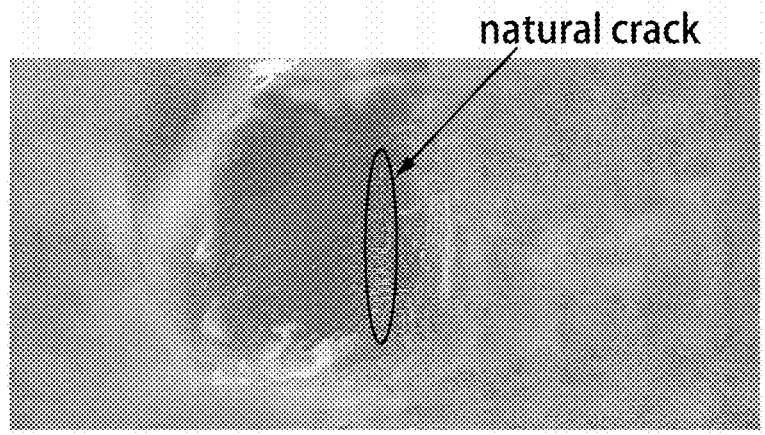
FIGS. 5(a)-5(f) show comparison of two defect images respectively separated out with conventional method and present invention.
Figure 5B:
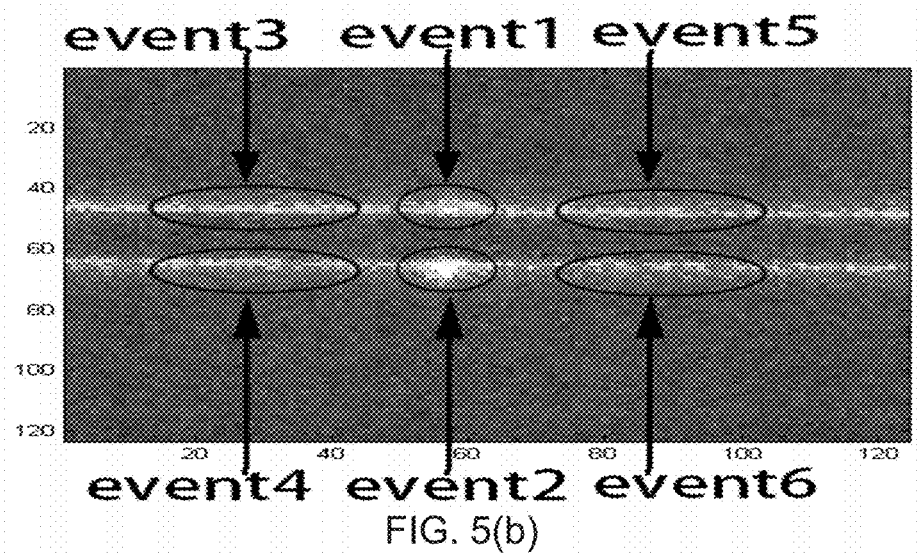
Figure 5C:
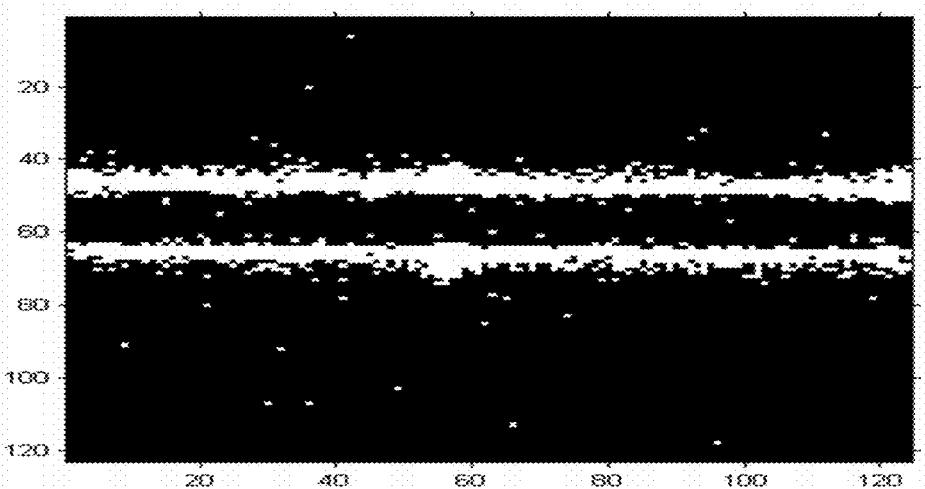
Figure 5D:
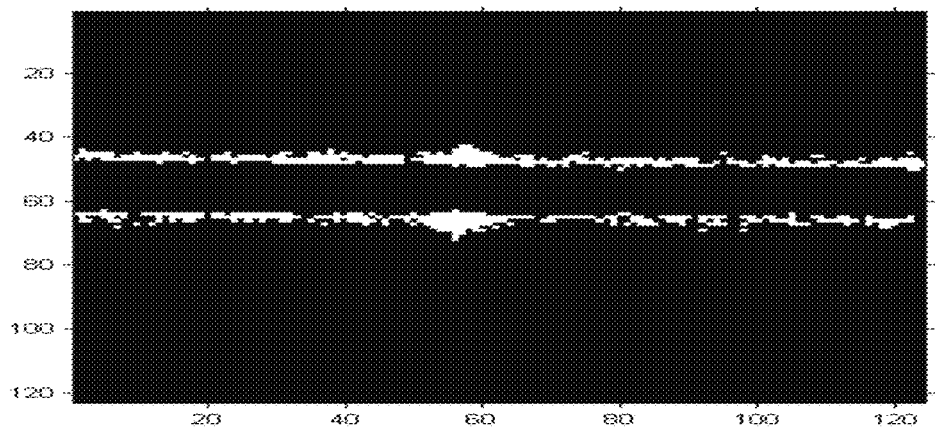
Figure 5E:
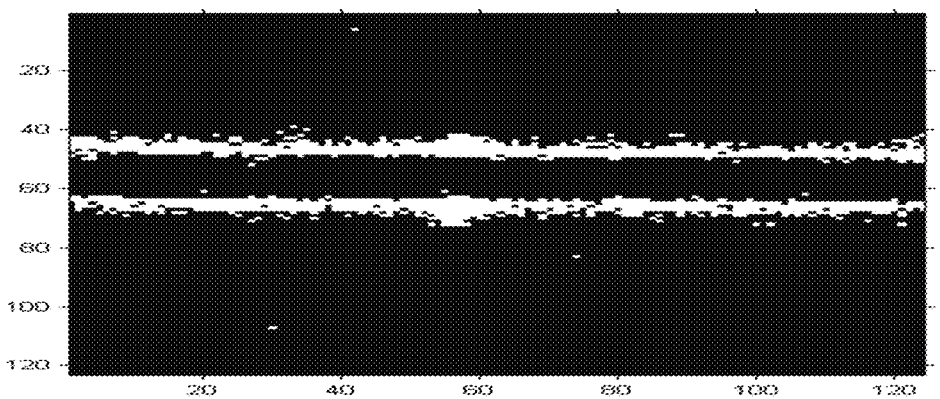
Figure 5F:
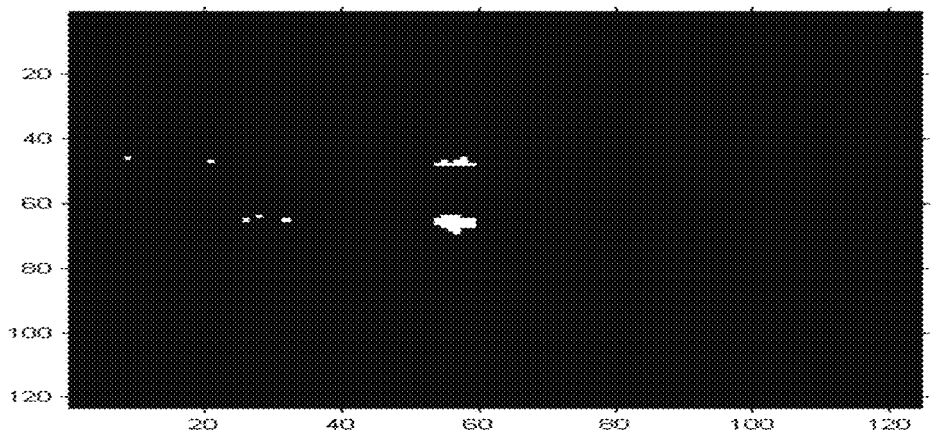

TPR is more closer to 1 and FPR is more smaller, the accuracy of separation is more better. In this embodiment, event 1 and event 2 shown in FIG. 5(b) are regarded as defects, the TPR and FPR results are shown in Table 1.

TABLE 1

|     | Otsu | IT  | Hamadani | The present invention |
|-----|------|-----|----------|----------------------|
| TPR | 1    | 1   | 1        | 1                    |
| FPR | 2/3  | 2/3 | 2/3      | 1/2                  |

As shown in Table 1, For the four methods, all the TPR is 1, which means that defect can be separated out by the methods. However, FPRs from Otsu, IT and Hamadani are greater than the FPR from the present invention, which denotes that, in the present invention, more accurate separation has achieved, it is more easily to identify and quantify the defect of conductive material.

While illustrative embodiments of the invention have been described above, it is, of course, understand that various modifications will be apparent to those of ordinary skill in the art. Such modifications are within the spirit and scope of the invention, which is limited and defined only by the appended claims.

What is claimed is:

1. A method for automatically separating out a defect image from a thermogram sequence, the method comprising the following steps:
   (1). pre-processing the thermogram sequence by Independent Component Analysis (ICA), including the following substeps:
   obtaining a spatial and temporal heating response sequence (thermogram sequence) from a surface of a conductive material through an Eddy Current Pulsed Thermography (ECPT) testing system, and processing the thermogram sequence by conventional ICA, then, selecting an independent component with maximum kurtosis to reconstruct a defect image matrix according a size of an original thermogram, where the defect image matrix is an image to be separated, and;
   (2). separating out the defect image based on a first derivative statistical characteristics of the image to be separated, including the following substeps:
   (2.1). dividing a histogram of the image to be separated into n groups (n≥2), where a magnitude of each group is calculated as follows:

$$\Delta V = \frac{V_{max} - V_{min}}{n};$$

where $V_{max}$ is a maximum pixel value, and $V_{min}$ is a minimum pixel value in the image to be separated, and subsequently, $V_i$ is defined as:

$$V_i = V_{min} + i \times \Delta V, \ i = 0, 1, 2 \ldots, n;$$

where each group is expressed as: $V_0 \sim V_1, V_1 \sim V_2, \ldots, V_{n-1} \sim V_n$, accumulating the corresponding pixel number $u_v$ of pixel value v that falls within $V_i \sim V_{i+1}$, and calculating an average pixel value of each group:

$$S_i = \sum_{V_{i-1} \le v < V_i} u_v, \ W_i = \frac{\sum_{V_{i-1} \le v < V_i} v \times u_v}{S_i}, \ i = 1, 2, \ldots, n-1$$

$$S_i = \sum_{V_{i-1} \le v \le V_i} u_v, \ W_i = \frac{\sum_{V_{i-1} \le v \le V_i} v \times u_v}{S_i}, \ i = n;$$

where $W_i$ is the average pixel value of group i, $S_i$ is a total pixel number of group i;

(2.2). calculating a first derivative $k_i$ of the total pixel number $S_i$:

$$k_i = S_i - S_{i-1}, \ i = 1, 2, \ldots, n, \text{ where } S_0 = 0; \text{ and}$$

(2.3). finding the maximum absolute value of $k_i$, $|k_i|_{max}$, where i is expressed as $i_{max}$, and obtaining the defect image by removing pixels which values are less than threshold T from the image to be separated, where If $i_{max}$ is equal to group number n, threshold T is $W_n$, otherwise, threshold T is $W_{i_{max}+1}$.

2. The method for automatically separating out a defect image from a thermogram sequence of claim 1, wherein the group number n in step (2.1) is found through the following steps:
   (2.1.1). initializing and coding a population, including:
   randomly generating a number of individuals with equal probability, and taking them as an initial population $\{X_1, X_2, \ldots, X_c, \ldots, X_m\}$, where m is the size of the initial population, which corresponds to a number of the generated individuals, $X_c$ is an individual of number c, a value of each individual is fallen in the scope that the group number is selected according to the histogram of the image to be separated;
   (2.1.2). calculating a fitness of each individual, including:
   taking each individual $X_c$ in the initial population as a group number n, and separating the defect image $R_C$ from the image to be separated according to step (2), then processing the defect image $R_C$ into a binary image, by filling the pixels removed with 0, and by filling the pixels not removed with 1, and calculating a fitness $H_C$ of the binary image as follows:

$$H_c = \sum_{d=0}^{D} p_d \log p_d;$$

where $p_d$ is the pixel number of pixel value d in the binary image, D=1;

(2.1.3) selecting a genetic seed such that: if a current population is the initial population, the initial population is taken as the genetic seed, otherwise, if the fitness of an individual in current population is smaller than a maximum individual fitness in previous population, the individual in the current population is randomly replaced by one of the individuals in previous population with a fitness greater than the fitness of the individual in the current population, and the current population replaced is taken as the genetic seed;

(2.1.4). crossing the genetic seed by changing bits of two individuals in the genetic seed;

(2.1.5). mutating the crossed genetic seed by changing bits of individuals in the crossed genetic seed from 1 to 0, or 0 to 1;

(2.1.6). taking the mutated genetic seed as the current population, and calculating the fitness of each individual in the current population according to the step (2.1.2);

returning to the step (2.1.3), if the number of generations of population is smaller than a set value;

or terminating the iteration, and selecting the individual having the maximum fitness from the current population as an optimal group number n, and finding the corresponding threshold T, then, separating out the defect image from the image to be separated for the purposes of quantitatively testing and identifying the defect of a conductive material.

3. The method for automatically separating out the defect image from a thermogram sequence of claim 2, wherein the size in of the initial population is 10, the crossover probability is set as 0.4, the mutation probability is set as 0.3, and the number of generations of population is set as 7.

* * * * *